(12) United States Patent
Hamabe et al.

(10) Patent No.: US 9,937,820 B2
(45) Date of Patent: Apr. 10, 2018

(54) VEHICLE SEAT

(71) Applicant: TOYOTA JIDOSHA KABUSHIKI KAISHA, Toyota-shi, Aichi-ken (JP)

(72) Inventors: Tsutomu Hamabe, Nissin (JP); Kohshi Katoh, Hadano (JP); Eishi Takeuchi, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 192 days.

(21) Appl. No.: 14/791,928

(22) Filed: Jul. 6, 2015

(65) Prior Publication Data

US 2016/0009199 A1 Jan. 14, 2016

(30) Foreign Application Priority Data

Jul. 8, 2014 (JP) .................. 2014-140919

(51) Int. Cl.
| | |
|---|---|
| *B60N 2/70* | (2006.01) |
| *B60N 2/02* | (2006.01) |
| *B60N 2/10* | (2006.01) |
| *B60N 2/64* | (2006.01) |
| *B60N 2/72* | (2006.01) |
| *B60N 2/39* | (2006.01) |

(52) U.S. Cl.
CPC .............. *B60N 2/028* (2013.01); *B60N 2/10* (2013.01); *B60N 2/39* (2013.01); *B60N 2/646* (2013.01); *B60N 2/70* (2013.01); *B60N 2/7011* (2013.01); *B60N 2/7094* (2013.01); *B60N 2/72* (2013.01)

(58) Field of Classification Search
CPC .......... A47C 7/28; A47C 7/282; A47C 7/285; A47C 7/027; A47C 7/14; B60N 2/7011; B60N 2/7047; B60N 2/7094
See application file for complete search history.

(56) References Cited

U.S. PATENT DOCUMENTS

| | | | | |
|---|---|---|---|---|
| 2,421,851 | A * | 6/1947 | Rivard .................. | B60N 2/7047 24/573.09 |
| 3,329,466 | A * | 7/1967 | Getz ........................ | A47C 7/20 267/111 |
| 4,883,320 | A * | 11/1989 | Izumida ............... | B60N 2/7094 297/284.1 |
| 6,386,638 | B1 * | 5/2002 | Strauch ................... | B60N 2/68 297/452.18 |
| 6,435,618 | B1 * | 8/2002 | Kawasaki ................ | A47C 7/28 297/452.56 |

(Continued)

FOREIGN PATENT DOCUMENTS

| | | |
|---|---|---|
| CN | 203472606 A | 3/2014 |
| JP | 2006061405 A | 3/2006 |

(Continued)

*Primary Examiner* — Timothy J Brindley
(74) *Attorney, Agent, or Firm* — Andrews Kurth Kenyon LLP

(57) ABSTRACT

A vehicle seat comprises a seat cushion frame configuring a frame member of a seat cushion, and a seat unit that is supported by the seat cushion frame and on which an occupant sits, that has a higher seating face rigidity in a seat front-rear direction than a seating face rigidity in a seat width direction, and that has the seating face rigidity in the seat width direction set lower at a seat front-rear direction rear side than at a seat front-rear direction front side.

6 Claims, 12 Drawing Sheets

(56) References Cited

U.S. PATENT DOCUMENTS

| | | | |
|---|---|---|---|
| 7,905,545 B2* | 3/2011 | Andersson | B60N 2/0232 297/180.1 |
| 2003/0001424 A1* | 1/2003 | Mundell | A47C 7/16 297/452.56 |
| 2003/0062758 A1* | 4/2003 | Cruz Fernandes de Pinho | B60N 2/7094 297/452.52 |
| 2005/0116527 A1* | 6/2005 | Leguen | A47C 3/02 297/452.56 |
| 2006/0055216 A1* | 3/2006 | Kawasaki | A47C 7/022 297/230.1 |
| 2010/0237669 A1* | 9/2010 | Kruger | B60N 2/4221 297/216.1 |
| 2012/0061988 A1* | 3/2012 | Jaranson | B60N 2/643 296/63 |
| 2013/0057035 A1* | 3/2013 | Nishiura | B60N 2/7011 297/218.3 |
| 2013/0119728 A1* | 5/2013 | Schmitt | B60N 2/54 297/217.3 |
| 2014/0077550 A1* | 3/2014 | Makiguchi | B60N 2/02 297/284.11 |
| 2014/0183924 A1* | 7/2014 | Cvek | A47C 9/002 297/452.18 |
| 2014/0191550 A1 | 7/2014 | Katoh et al. | |
| 2014/0225407 A1* | 8/2014 | Nagayasu | B60N 2/14 297/344.1 |
| 2015/0108806 A1* | 4/2015 | Nagayasu | B60N 2/7094 297/337 |
| 2015/0167214 A1* | 6/2015 | Fiorenzi | D04H 3/04 442/58 |
| 2015/0239381 A1* | 8/2015 | Hamabe | B60N 2/7094 297/313 |
| 2016/0066695 A1* | 3/2016 | Frankel | A47C 4/00 297/313 |
| 2016/0185265 A1* | 6/2016 | Romer | B60N 2/68 297/216.1 |
| 2016/0280109 A1* | 9/2016 | Ito | B60N 2/6009 |
| 2016/0368404 A1* | 12/2016 | Sammons | B60N 2/54 |
| 2017/0113585 A1* | 4/2017 | Fuwa | B60N 2/7094 |

FOREIGN PATENT DOCUMENTS

| | | |
|---|---|---|
| JP | 2007-117186 A | 5/2007 |
| JP | 2011-051490 A | 3/2011 |
| JP | 2014-133479 A | 7/2014 |
| JP | 2014-151791 A | 8/2014 |
| JP | 2014-169067 A | 9/2014 |
| JP | 2015-024680 A | 2/2015 |
| WO | 2013/021497 A1 | 2/2013 |

* cited by examiner

FIG.3A
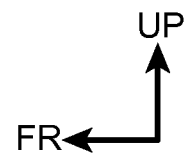
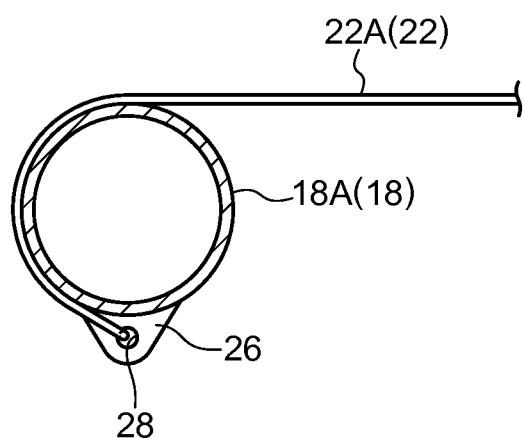
FIG.3B
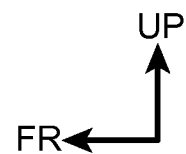
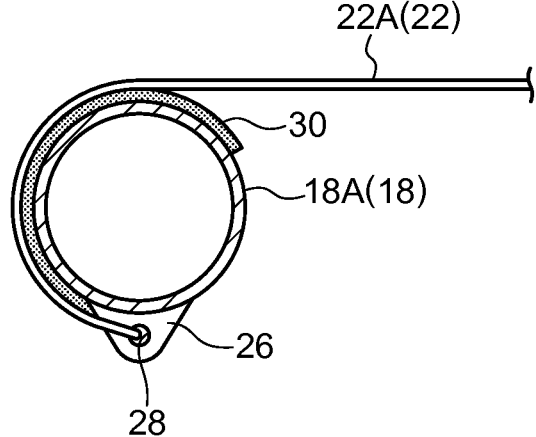

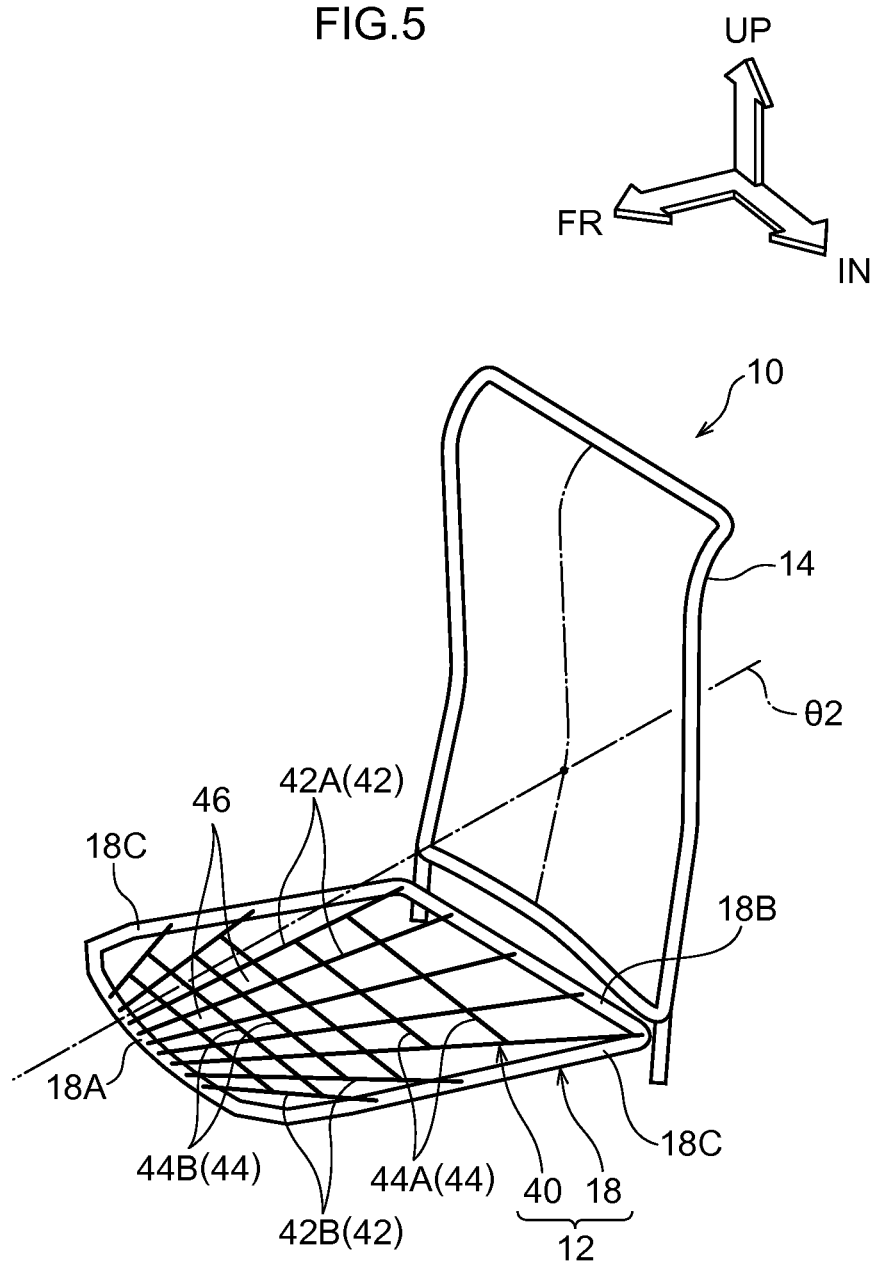

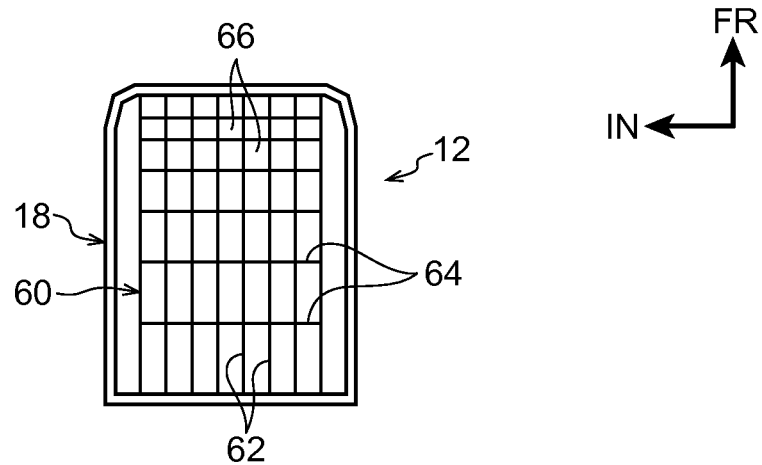
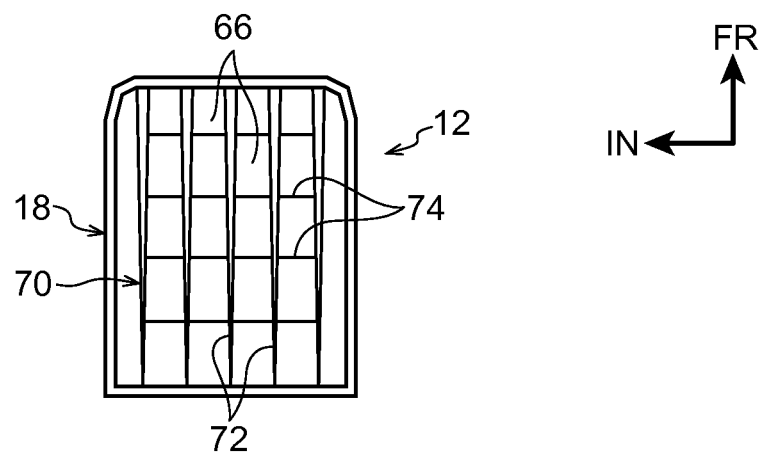
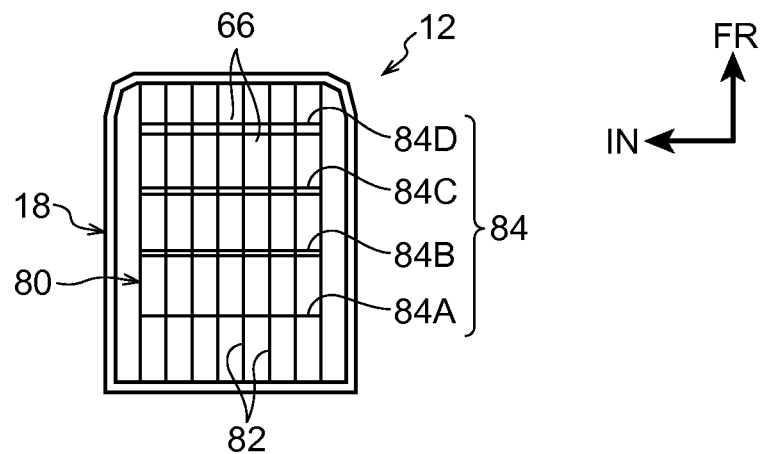

VEHICLE SEAT

CROSS-REFERENCE TO RELATED APPLICATION

This application claims priority under 35 USC 119 from Japanese Patent Application, No. 2014-140919 filed Jul. 8, 2014, the disclosure of which is incorporated by reference herein.

BACKGROUND OF THE INVENTION

Technical Field

The present invention relates to a vehicle seat.

Related Art

International Publication (WO) No. 2013/021497 describes an invention relating to a vehicle seat device. To explain briefly, a vehicle seat is provided with a seat frame configured including a first seat frame portion disposed at a seat cushion side, and a second seat frame portion disposed at a seatback side. A seat portion support mechanism that employs bearings to rotatably support a seat portion, on which an occupant sits, is provided at the center of a front portion of the first seat frame portion. The axial line of a rotation axis of the seat portion support mechanism is oriented in a direction tilted at a specific angle, such that the rear is higher than the front in the seat front-rear direction. The seat portion is accordingly capable of swaying by rotating the seat portion about the rotation axis of the seat portion support mechanism.

Moreover, a seatback support mechanism in which bearings are employed to rotatably support a seatback that supports the back of the occupant, is provided at a height direction intermediate portion of the second seat frame portion. The axial line of a rotation axis of the seatback support mechanism is oriented toward the seat front-rear direction. Thus the seatback is capable of swaying about the rotation axis of the seatback support mechanism.

In the above configuration, the driver consciously or unconsciously attempts to rotate (swing) their pelvis and shoulders in opposite directions when the vehicle turns. When this occurs, the seat portion sways, and the seatback also sways, such that the seat portion and the seatback follow the movement of the occupant.

SUMMARY

However, in the case of the related art described above, configuration is made such that the swaying action of the seat portion is realized by the seat portion support mechanism, and issues thereby arise in that there is a large number of components, and the structure is complex.

In consideration of the above circumstances, a subject of the present invention is to obtain a vehicle seat capable of allowing the lumbar region of an occupant to sway during lateral acceleration of the vehicle, using a simple configuration.

A vehicle seat of a first aspect of the present invention includes a seat cushion frame configuring a frame member of a seat cushion, and a seat unit that is supported by the seat cushion frame and on which an occupant sits, that has a higher seating face rigidity in a seat front-rear direction than a seating face rigidity in a seat width direction, and that has the seating face rigidity in the seat width direction set lower at a seat front-rear direction rear side than at a seat front-rear direction front side.

The vehicle seat of the first aspect operates as follows. In general, during lateral acceleration of a vehicle, such when the vehicle turns, an inertial force also acts on the occupant in the vehicle width direction. Thus the head of the seated occupant is apt to move in the application direction of the inertial force, direction of their vision moves greatly in the application direction of the inertial force, and steering operation performance is affected.

In contrast thereto, the present inventors have found from their research that, if, during lateral acceleration of the vehicle, the seating face can function so as to roll-rotate the lumbar region of the occupant about a hypothetical rotation axis, which passes through the vicinity of the lumbar spine of the seated occupant and tilts downward toward the front (hereafter referred to as "seating face rotation axis"), the movement of the head of the seated occupant can be suppressed to a minimal amount, and the burden on the occupant seated in a front seat (particularly the driver) is greatly reduced.

In the first aspect, the seat unit supported by the seat cushion frame is set with higher seating face rigidity in the seat front-rear direction than the seating face rigidity in the seat width direction. Namely, the rigidity distribution of the seating face of the seat unit is anisotropic. Thus, first, a hypothetical rotation axis (a roll axis, lateral rotation axis of the lumbar region) is formed running along the seat front-rear direction in a space above the seat unit. Furthermore, the seating face rigidity in the seat width direction of the seat unit is set lower at the seat front-rear direction rear side than at the front side, such that a front side of the hypothetical rotation axis (roll axis of the lumbar region) drops down toward the seating face side, and rises at a rear side. The seating face rotation axis is accordingly formed passing through the vicinity of the lumbar spine of the seated occupant tilting downward toward the front. Namely, in the present aspect, rather than setting a complex configuration using bearings or the like between the seat cushion frame and the seat unit in order to allow the seat unit to sway, the seat unit itself has a function of allowing the lumbar region to sway about the seating face rotation axis.

A vehicle seat of a second aspect of the present invention is the first aspect, wherein the seat unit is formed in a net form including plural longitudinal direction fiber members extending along the seat front-rear direction, and plural lateral direction fiber members extending along the seat width direction, and the respective fiber members are disposed more sparsely at the seat front-rear direction rear side than at the seat front-rear direction front side of the seat unit.

In the vehicle seat of the second aspect, the seat unit is formed in a net form including the plural longitudinal direction fiber members and the plural lateral direction fiber members. Furthermore, the fiber members are disposed more sparsely at the seat front-rear direction rear side than at the front side of the seat unit, such that the rigidity of the seat unit at the seat front-rear direction rear side is comparatively lower than the rigidity at the front side. Thus in the present aspect, the seating face rigidity of the seat unit is realized by the placement density of the longitudinal direction fiber members and the lateral direction fiber members. In other words, the rigidity distribution of the seat unit can be set to a desired distribution, simply by changing the placement density of the longitudinal direction fiber members and the lateral direction fiber members.

A vehicle seat of a third aspect of the present invention is the second aspect, wherein the longitudinal direction fiber members are thinner at the seat front-rear direction rear side than at the seat front-rear direction front side.

In the vehicle seat of the third aspect, the longitudinal direction fiber members are thinner at the seat front-rear direction rear side than at the seat front-rear direction front side, thereby enabling a difference in rigidity to be created in the seat unit by the longitudinal direction fiber members themselves. This enables both the number of longitudinal direction fiber members used and the number of lateral direction fiber members used to be reduced.

A vehicle seat of a fourth aspect of the present invention is the second aspect, wherein the lateral direction fiber members disposed at the seat front-rear direction rear side are thinner than the lateral direction fiber members disposed at the seat front-rear direction front side.

In the vehicle seat of the fourth aspect, the lateral direction fiber members disposed at the seat front-rear direction rear side are thinner than the lateral direction fiber members disposed at the seat front-rear direction front side, thereby enabling a difference in rigidity to be created in the seat unit by the lateral direction fiber members themselves. This enables the number of lateral direction fiber members used to be reduced.

A vehicle seat of a fifth aspect of the present invention is any one of the second aspect to the fourth aspect, wherein a number of seating face regions partitioned by the longitudinal direction fiber members, and the lateral direction fiber members or the seat cushion frame is smaller at the seat front-rear direction rear side than at the seat front-rear direction front side.

In the vehicle seat of the fifth aspect, the number of seating face regions partitioned by the longitudinal direction fiber members, and the lateral direction fiber members or the seat cushion frame is smaller at the seat front-rear direction rear side than at the seat front-rear direction front side, such that the seating face rigidity of the seat unit is lower at the seat front-rear direction rear side than at the front side.

A vehicle seat of a sixth aspect of the present invention is any one of the second aspect to the fifth aspect, wherein both end portions of the lateral direction fiber members that are disposed at the seat front-rear direction front side of the seat unit are fixed to the seat cushion frame, and both end portions of the lateral direction fiber members that are disposed at a rear side of the lateral direction fiber members, which are disposed at the front side of the seat unit, are fixed to the longitudinal direction fiber members.

In the vehicle seat of the sixth aspect, both end portions of the lateral direction fiber members disposed at the seat front-rear direction front side of the seat unit are fixed to the seat cushion frame, such that the supporting rigidity of the lateral direction fiber members at this portion is comparatively high. In contrast thereto, both end portions of the lateral direction fiber members that are disposed at rear side of the lateral direction fiber members, which are disposed at the front side of the seat unit, are fixed to the longitudinal direction fiber members, such that the supporting rigidity of the lateral direction fiber members at this portion is comparatively low.

A vehicle seat of a seventh aspect of the present invention is any one of the second aspect to the fifth aspect, wherein both end portions of the lateral direction fiber members that are disposed at the seat front-rear direction front side of the seat unit are fixed to the seat cushion frame, and a lateral direction fiber member non-placement region in which the lateral direction fiber members are not disposed is provided at the seat front-rear direction rear side of the seat unit.

In the vehicle seat of the seventh aspect, both end portions of the lateral direction fiber members that are disposed at the seat front-rear direction front side of the seat unit are fixed to the seat cushion frame, such that the supporting rigidity of the lateral direction fiber members at this portion is comparatively high. In contrast thereto, the lateral direction fiber member non-placement region in which the lateral direction fiber members are not disposed is provided at the seat front-rear direction rear side of the seat unit, such that the supporting rigidity of the lateral direction fiber members at this portion is equivalent to zero.

A vehicle seat of an eighth aspect of the present invention is the first aspect, wherein the seat unit is configured by a resin seat cushion pad that has cushioning properties, and plural thinned portions are formed at a seating face side of the seat cushion pad, such that the rigidity of the seat cushion pad is lower at the seat front-rear direction rear side than at the seat front-rear direction front side.

In the vehicle seat of the eighth aspect, the seat unit is configured by the resin seat cushion pad that has cushioning properties. Moreover, the plural thinned portions are formed at the seating face side of the seat cushion pad, such that the rigidity of the seat cushion pad is lower at the seat front-rear direction rear side than at the seat front-rear direction front side. Thus in the present aspect, the seating face rigidity of the seat unit is realized by the shape (placement, shape, and size, etc. of the thinned portions) at the seating face side of the seat cushion pad. In other words, the rigidity distribution of the seat unit can be set to a desired distribution simply by changing the shape of the resin at the seating face side of the seat cushion pad. Thus the seat unit is easy to make, and the rigidity is easy to adjust.

A vehicle seat of a ninth aspect of the present invention is the eighth aspect, wherein the thinned portions are formed by recessed grooves extending along the seat front-rear direction, and a greater number of the recessed grooves are formed at the seat front-rear direction rear side than at the seat front-rear direction front side.

In the vehicle seat of the ninth aspect, the thinned portions are formed by the recessed grooves extending along the seat front-rear direction, and there are a greater number of the recessed grooves at the seat front-rear direction rear side than at the front side, such that the rigidity of the seat unit is lower at the seat front-rear direction rear side than at the front side. Configuration is made such that the rigidity of the seat unit changes according to the number of recessed grooves. Thus, in a hypothetical case in which the rigidity of the seat front-rear direction rear side of the seat unit is lowered to a particular rigidity, the depth of the recessed grooves can be made shallower by increasing the number of recessed grooves. This configuration is therefore suitable for cases in which the thickness of the seat unit is comparatively thin.

A vehicle seat of a tenth aspect or an eleventh aspect of the present invention is the eighth aspect or the ninth aspect, wherein the thinned portions are formed by recessed grooves extending along the seat front-rear direction, and a groove depth of each recessed groove is set deeper at the seat front-rear direction rear side than at the seat front-rear direction front side.

In the vehicle seat of the tenth aspect or the eleventh aspect, the thinned portions are formed by the recessed grooves extending along the seat front-rear direction, and the groove depth is deeper at the seat front-rear direction rear side than at the front side, such that the rigidity of the seat unit is lower at the seat front-rear direction rear side than at the front side. Configuration is made such that the rigidity of the seat unit changes according to the depth of the recessed grooves. In a hypothetical case in which the rigidity of the seat front-rear direction rear side of the seat unit is lowered to a particular rigidity, the number of recessed grooves can be reduced by making the recessed grooves deeper.

As explained above, the vehicle seat of the first aspect of the present invention exhibits an excellent advantageous effect of enabling the lumbar region of an occupant to sway during lateral acceleration of the vehicle, using a simple structure.

The vehicle seat of the second aspect of the present invention exhibits an excellent advantageous effect of enabling design to optimize seating face rigidity to be achieved comparatively easily.

The vehicle seat of the third aspect of the present invention exhibits an excellent advantageous effect of enabling a reduction in costs by reducing both the number of longitudinal direction fiber members used, and the number of lateral direction fiber members used.

The vehicle seat of the fourth aspect of the present invention exhibits an excellent advantageous effect of enabling a contribution to a reduction in costs by reducing the number of lateral direction fiber members used.

The vehicle seat of the fifth aspect of the present invention exhibits an excellent advantageous effect of enabling the rigidity distribution of the seat unit to be set to a desired distribution, simply by changing the number of seating face regions.

The vehicle seat of the sixth aspect of the present invention exhibits an excellent advantageous effect of enabling the rigidity distribution of the seat unit to be easily changed, by fixing both end portions of the lateral direction fiber members either to the seat cushion frame, or fixing both end portions of the lateral direction fiber members to the longitudinal direction fiber members.

The vehicle seat of the seventh aspect of the present invention exhibits an excellent advantageous effect of enabling a large difference in the rigidity distribution of the seat unit to be easily provided depending on the range over which the lateral direction fiber member non-placement region is provided.

The vehicle seat of the eighth aspect of the present invention exhibits an excellent advantageous effect of enabling design to optimize seating face rigidity to be performed comparatively easily, of enabling productivity to be improved, and also of enabling the rigidity to be easily adjusted.

The vehicle seat of the ninth aspect of the present invention exhibits an excellent advantageous effect of being suitable for adjusting the rigidity distribution in cases in which the seat unit is wide in the seat width direction.

The vehicle seat of the tenth aspect and the eleventh aspect of the present invention exhibit an excellent advantageous effect of being suitable for adjusting the rigidity distribution in cases in which the thickness of the seat unit is comparatively thick.

BRIEF DESCRIPTION OF THE DRAWINGS

Embodiments of the present invention will be described in detail based on the following figures, wherein:

FIG. 3A is an enlarged cross-section of relevant portions, illustrating a fixing structure of a longitudinal direction fiber member to a seat cushion frame;

FIG. 3B is an enlarged cross-section of relevant portions, illustrating a modified example of the fixing structure in FIG. 3A;

FIG. 5 is a perspective view illustrating a vehicle seat according to a modified example 1 of the first exemplary embodiment;

FIG. 9A is a plan view illustrating a seat cushion of a vehicle seat according to a modified example 4 of the first exemplary embodiment;

FIG. 9B is a plan view illustrating a seat cushion of a vehicle seat according to a modified example 5 of the first exemplary embodiment;

FIG. 9C is a plan view illustrating a seat cushion of a vehicle seat according to a modified example 6 of the first exemplary embodiment;

DETAILED DESCRIPTION OF THE INVENTION

First Exemplary Embodiment

Explanation follows regarding a first exemplary embodiment of a vehicle seat according to the present invention, with reference to FIG. 1 to FIG. 9. Note that in each of the drawings, the arrow FR indicates the vehicle front side, the arrow UP indicates the vehicle upper side, and the arrow IN indicates the vehicle width direction inside as appropriate.

Figure 2:
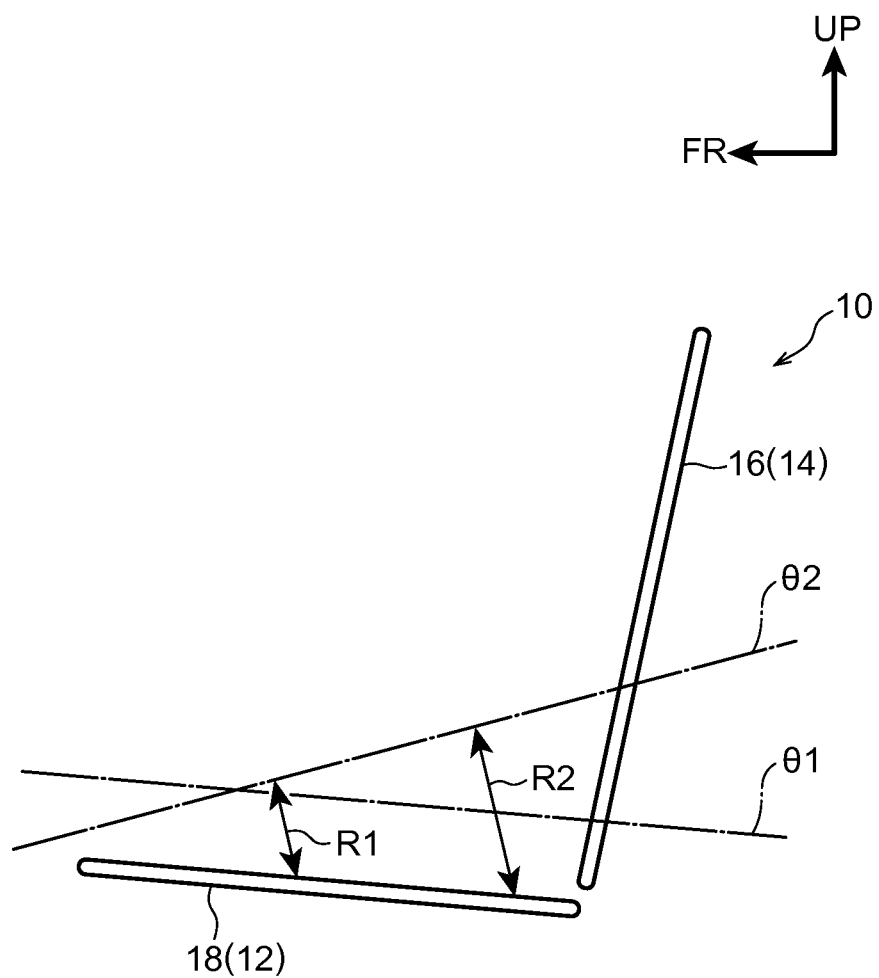
FIG. 2 is a schematic side view of a vehicle seat provided with the seat cushion illustrated in FIG. 1.

As illustrated in FIG. 2, a vehicle seat 10 is configured including a seat cushion 12 supporting the buttocks and thighs of an occupant, a seatback 14 (tiltably) supported at a rear end portion of the seat cushion 12 and supporting the back of the occupant, and a headrest (not illustrated in the drawings) provided with adjustable height at an upper end portion of the seatback 14 and supporting the head of the occupant. Note that only a seatback frame 16 of the seatback 14 is illustrated in FIG. 2, and that a seatback pad supporting the back of the occupant, a cover, and the like, are omitted from the drawings.

Figure 1:
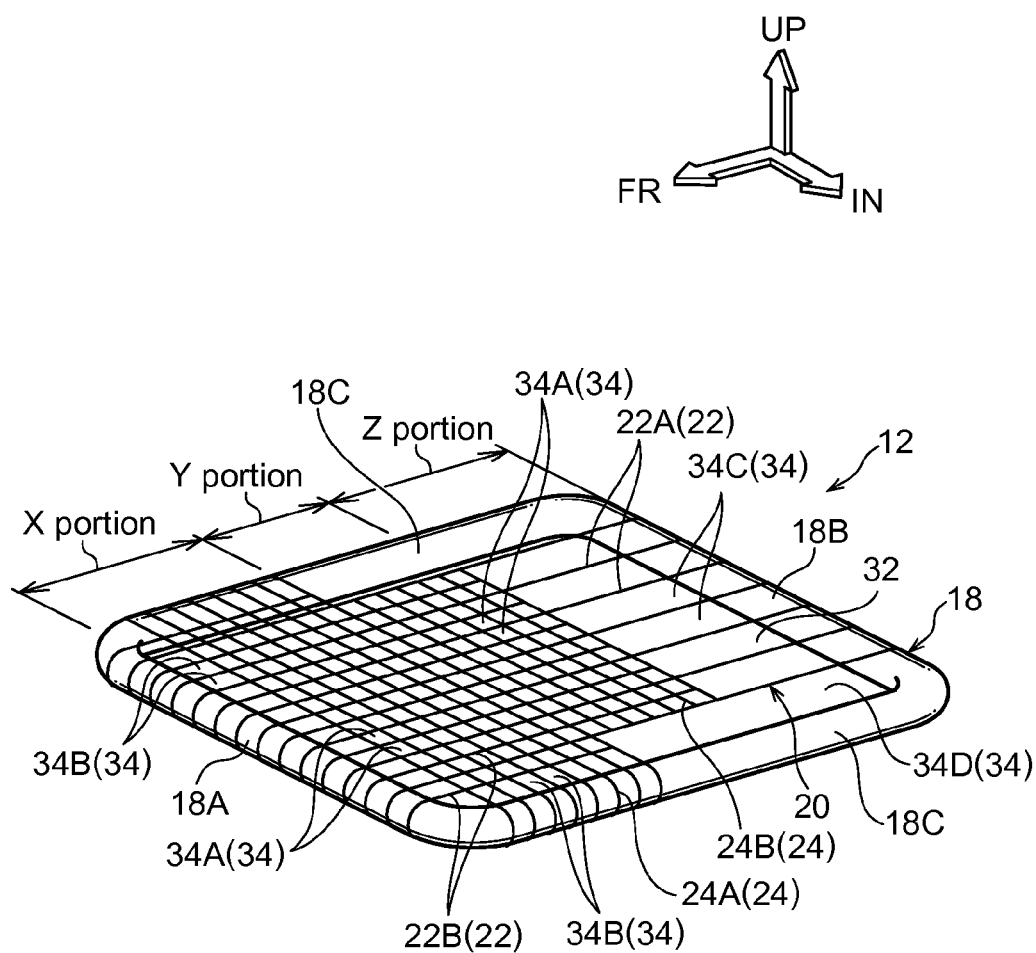
FIG. 1 is a perspective view of a seat cushion of a vehicle seat according to a first exemplary embodiment.

As illustrated in FIG. 1, the seat cushion 12 includes a metal seat cushion frame 18 configuring a frame member of the seat cushion 12. The seat cushion frame 18 is configured in a rectangular frame shape in plan view. The seat cushion frame 18 is moreover configured by a front side frame 18A and a rear side frame 18B, disposed running parallel to each other along the seat width direction, and a pair of left and right side frames 18C disposed running parallel to each other along the seat front-rear direction. The front side frame 18A, the rear side frame 18B, and the pair of left and right side frames 18C are each configured by a pipe member.

Note that although the seat cushion frame 18 is configured by metal pipe members in the present exemplary embodiment, configuration is not limited thereto, and the seat cushion frame may be configured by a different material or different structural members. For example, the seat cushion frame may be configured by joining press-formed components made of steel plates formed with U shaped or C shaped cross-sections, by welding or joining by bolts, etc. Alternatively, the seat cushion frame may be configured by extrusion-formed aluminum alloy components, or resin-molded components made of a fiber reinforced plastic such as CFRP. Note that this point similarly applies to the seatback frame 16 of the seatback 14.

A seat unit 20, on which the occupant sits, is installed at an upper end side of the seat cushion frame 18 described above. Configuration of the seat unit 20 in the present exemplary embodiment includes features explained in detail below.

The seat unit 20 is configured by a net strung over the entire seat cushion frame 18 along the seat front-rear direction. Structurally, the seat unit 20 is configured including plural longitudinal direction fiber members 22 extending along the seat front-rear direction, and plural lateral direction fiber members 24 extending along the seat width direction. Each of the longitudinal direction fiber members 22 and lateral direction fiber members 24 is configured as a collective body of thin fibers, and is made of resin.

More specifically, the plural longitudinal direction fiber members 22 are configured by plural first longitudinal direction fiber members 22A strung between the front side frame 18A and the rear side frame 18B, and plural second longitudinal direction fiber members 22B strung between the front side frame 18A and the lateral direction fiber members 24. Each of the first longitudinal direction fiber members 22A and the second longitudinal direction fiber members 22B is disposed at a specific pitch in the seat width direction. Longer second longitudinal direction fiber members 22B are disposed at intermediate positions between adjacent first longitudinal direction fiber members 22A, and shorter second longitudinal direction fiber members 22B are disposed at the outsides of the first longitudinal direction fiber members 22A disposed at both sides in the seat width direction.

As illustrated in FIG. 3A, an inverted triangle shaped attachment portion 26 is provided protruding out toward the seat lower side at an outer peripheral lower end portion of the front side frame 18A. The attachment portion 26 is formed in a plate shape, with an attachment hole 28 formed at a center portion thereof. Plural attachment portions 26 are disposed running along the width direction of the front side frame 18A at a specific pitch. Note that although the attachment portions 26 are disposed protruding out toward the seat lower side in the configuration illustrated in FIG. 3A, it is sufficient that the attachment portion does not have a configuration protruding out toward the seat upper side or the seat front side, and the attachment portion may protrude out toward the seat rear side.

A front end portion of each first longitudinal direction fiber member 22A is wound about an outer peripheral front side portion of the front side frame 18A, and then inserted through the attachment hole 28 of the respective attachment portion 26. The end portion of the first longitudinal direction fiber member 22A inserted through the attachment hole 28 is then folded back over the attachment portion 26, and then fixed to the first longitudinal direction fiber member 22A by a fixing means such as an adhesive. An attachment structure of a rear end portion of each first longitudinal direction fiber member 22A to the rear side frame 18B is similar to the attachment structure of each first longitudinal direction fiber member 22A to the front side frame 18A. Note that the attachment structure of the first longitudinal direction fiber member 22A to the attachment portion 26 is not limited thereto, and a different structure may be applied. For example, a hook may be attached to an end portion of the first longitudinal direction fiber member 22A, and the hook may be anchored to the attachment hole 28 of the attachment portion 26.

Moreover, in the attachment structure of the front end portion of the first longitudinal direction fiber member 22A illustrated in FIG. 3A, the front end portion of the longitudinal direction fiber member 22A is directly wound around the outer peripheral front side portion of the front side frame 18A. However, configuration is not limited thereto, and as illustrated in FIG. 3B, the front end portion of the first longitudinal direction fiber member 22A may be wound around the outer peripheral front side portion of the front side frame 18A with a member interposed therebetween. In the example illustrated in FIG. 3B, a covering layer 30, configured from urethane or the like, is provided at an outer peripheral portion of the front side frame 18A, at least in a range contacting the longitudinal direction fiber member 22. Such a configuration enables damage of the first longitudinal direction fiber member 22A due to wear, and the occurrence of abnormal noise due to the front end portion of the first longitudinal direction fiber member 22A directly rubbing against the front side frame 18A, to be suppressed or prevented.

The attachment structure of the front end portions of the first longitudinal direction fiber members 22A has been explained above, and front end portions of the second longitudinal direction fiber members 22B are attached to the respective attachment portions 26 of the front side frame 18A, in a similar manner to the front end portions of the first longitudinal direction fiber members 22A.

As illustrated in FIG. 1, the plural lateral direction fiber members 24 are configured by plural first lateral direction fiber members 24A and second lateral direction fiber members 24B disposed at a specific pitch in the seat front-rear direction. The first lateral direction fiber members 24A are strung along the seat width direction between the left and right side frames 18C at a front side in the seat front-rear direction of the seat cushion frame 18 (see the X portion). The second lateral direction fiber members 24B are strung along the seat width direction between the outermost first longitudinal direction fiber members 22A at an intermediate portion in the seat front-rear direction of the seat cushion frame 18 (see the Y portion). Note that a lateral direction fiber member non-placement region 32, in which any lateral direction fiber members 24 are not disposed, is provided at a rear side in the seat front-rear direction of the seat cushion frame 18 (see the Z portion).

Both end portions of each first lateral direction fiber member 24A are attached to the respective left and right side frames 18C. An attachment structure of the end portions of the first lateral direction fiber members 24A to the side frames 18C is similar to the attachment structure of the front end portions of the first longitudinal direction fiber members 22A to the front side frame 18A. Both end portions of each second lateral direction fiber member 24B are attached to the pair of first longitudinal direction fiber members 22A positioned adjacent to the respective side frames 18C by a fixing means such as an adhesive.

Figure 4A:
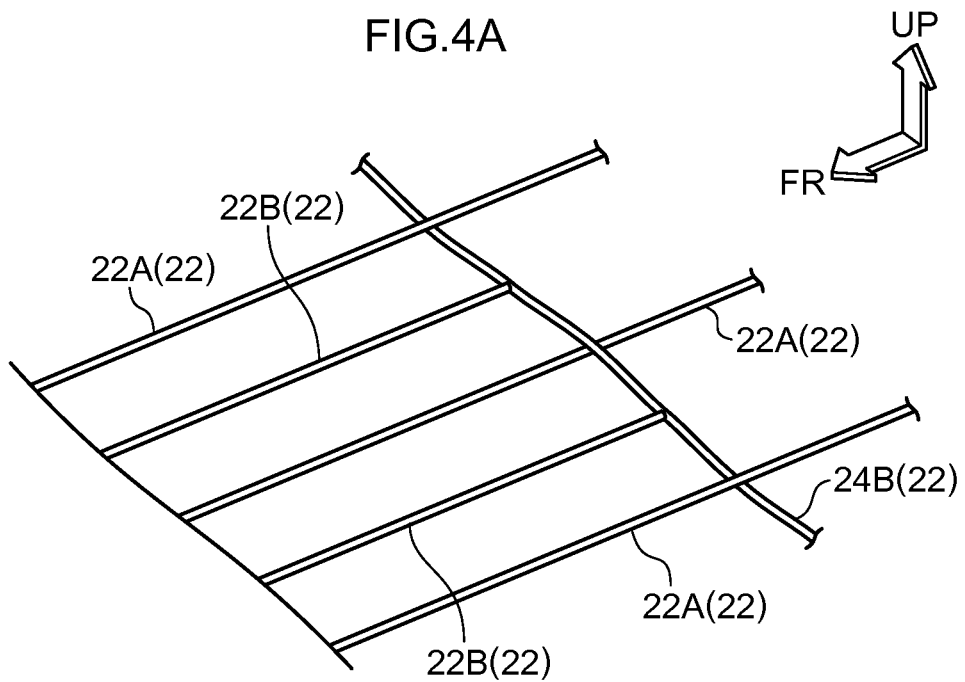
FIG. 4A is an enlarged perspective view of relevant portions, illustrating a connection structure of longitudinal direction fiber members and a lateral direction fiber member.
Figure 4B:
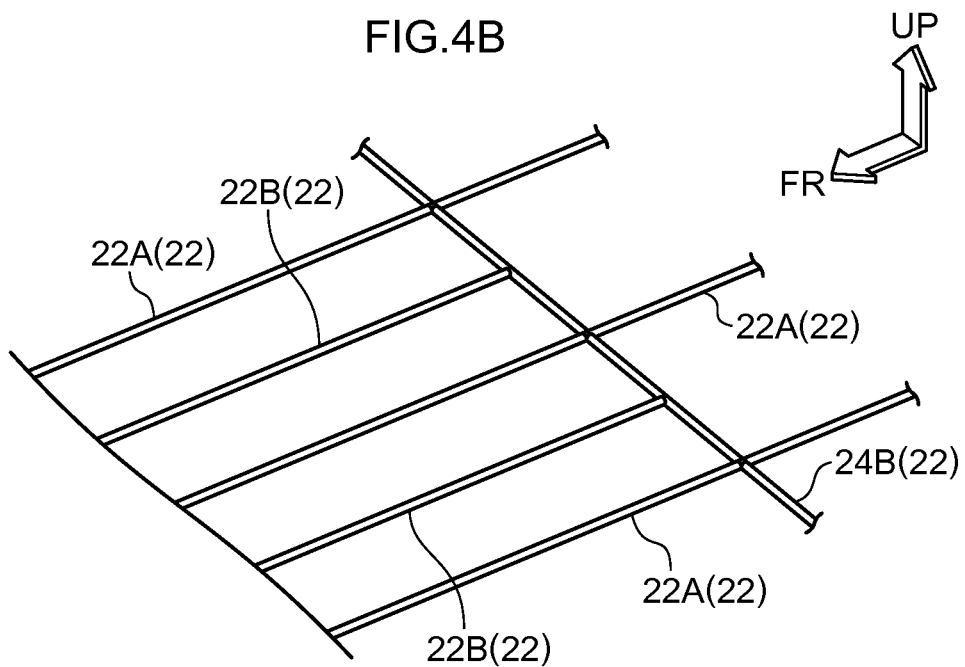
FIG. 4B is an enlarged perspective view of relevant portions, illustrating a modified example of the connection structure in FIG. 4A.

Rear end portions of the second longitudinal direction fiber members 22B previously described are attached to the respective first lateral direction fiber member 24A or second lateral direction fiber member 24B disposed at the rear most position, by a fixing means such as an adhesive (see FIG. 4A). FIG. 4A illustrates connection locations between the second longitudinal direction fiber members 22B and the second lateral direction fiber member 24B. In the configuration illustrated in FIG. 4A, the second lateral direction fiber member 24B passes to the upper side or the lower side of the first longitudinal direction fiber members 22A, without being adhered thereto. However configuration is not limited thereto, and as illustrated in FIG. 4B, the second lateral direction fiber member 24B may be adhered not only to the second longitudinal direction fiber members 22B, but also to the first longitudinal direction fiber members 22A, at intersection portions therewith.

In the thus configured seat unit 20, the fiber members strung along the seat front-rear direction are disposed across the entire seat cushion frame 18, as previously described. However, the fiber members strung along the seat width direction are mainly disposed at the seat front-rear direction front side of the seat cushion frame 18. Fiber members generally have high rigidity with respect to the application direction of tensile force, but have low rigidity with respect to bending. Thus in the case of the seat unit 20 of the present exemplary embodiment, in which the fiber members are strung along the seat front-rear direction across the entire seat cushion frame 18, rigidity is comparatively high in the seat front-rear direction, this being the application direction of tensile force on the longitudinal direction fiber members 22, and rigidity is comparatively low in the seat width direction, this being an axis-orthogonal direction to the longitudinal direction fiber members 22. Namely, in the seat unit 20, the rigidity of a seating face is set higher in the seat front-rear direction than the rigidity of the seating face in the seat width direction.

Furthermore, in the seat unit 20 with the above configuration, the fiber members are more sparsely disposed at the seat front-rear direction rear side than at the front side. To explain this point with reference to FIG. 1, the fiber members are densely disposed at the seat front-rear direction front side of the seat unit 20 (see the X portion), the fiber members are disposed to an intermediate extent at the seat front-rear direction intermediate portion of the seat unit 20 (see the Y portion), and the fiber members are sparsely disposed at the seat front-rear direction rear side of the seat unit 20 (see the Z portion). Namely, the density of the fiber members, which are configured by the longitudinal direction fiber members 22 and the lateral direction fiber members 24, changes from dense to sparse in stages on progression from the seat front-rear direction front side toward the rear side of the seat unit 20. To explain this from a different perspective, the seat unit 20 is partitioned into multiple rectangular shaped regions by the longitudinal direction fiber members 22, the lateral direction fiber members 24, or the seat cushion frame 18. The regions are collectively referred to below as "seating face regions 34", and when referring to each region individually, the regions are referred to as "seating face regions 34A, 34B, 34C, 34D" in sequence from the smallest area. Considering the number of seating face regions 34, there is a large number of seating face regions 34, configured by a dense concentration of the seating face regions 34A and the seating face regions 34B with small areas, at the seat front-rear direction front side of the seat unit 20, an intermediate number of seating face regions 34 at the seat front-rear direction intermediate portion of the seat unit 20, configured by the seating face regions 34A with the small areas and front sides of the seating face regions 34D with the largest areas, and a small number of seating face regions 34 at the seat front-rear direction rear side of the seat unit 20, configured by the seating face regions 34C with large areas and rear sides of the seating face regions 34D. Thus the seat unit 20 is set with lower seating face rigidity in the seat width direction at the rear side than at the front side in the seat front-rear direction. To refer to a relationship with a seating face rotation axis θ2, described later, as illustrated in FIG. 2, rigidity distribution of the seat unit 20 is set in inverse proportion to a distance from the seating face rotation axis θ2 to the seating face (rotation radius R1<R2).

Operation and Advantageous Effects of Present Exemplary Embodiment

Explanation follows regarding operation and advantageous effects of the present exemplary embodiment.

In the seat unit 20 supported by the seat cushion frame 18 in the vehicle seat 10 according to the present exemplary embodiment, the seating face rigidity in the seat front-rear direction is set higher than the seating face rigidity in the seat width direction. Namely, the rigidity distribution of the seating face in the seat unit 20 is anisotropic. Thus the lumbar region of a seated occupant is susceptible to sway in the seat width direction. First, a hypothetical rotation axis (a roll axis, lateral rotation axis of the lumbar region) θ1 is accordingly formed running along the seat front-rear direction in a space above the seat unit 20 (see FIG. 2). Furthermore, the seating face rigidity in the seat width direction of the seat unit 20 is set lower at the rear side than at the front side in the seat front-rear direction. Namely, the lumbar region of the seated occupant sways more easily at the seat rear side than at the front side, such that the hypothetical rotation axis (roll axis of the lumbar region) θ1 drops down toward the seating face side at a front side, and rises at a rear side. The seating face rotation axis θ2 is accordingly formed passing through the vicinity of the lumbar spine of the seated occupant, and tilts downward toward the front. Namely, in the vehicle seat 10 according to the present exemplary embodiment, rather than setting a complex configuration using bearings or the like between the seat cushion frame 18 and the seat unit 20 so as to allow the seat unit 20 to sway, the seat unit 20 itself has a function of allowing the lumbar region of the seated occupant to sway about the seating face rotation axis θ2. Thus the present exemplary embodiment enables swaying of the lumbar region of the occupant during lateral acceleration of the vehicle, using a simple configuration.

To consider this in an actual situation in which the vehicle is traveling, when the vehicle turns, a force toward outside of the turning direction due to inertial force acts on the seated occupant. Thus in the vehicle seat 10 according to the present exemplary embodiment, the lumbar region sways about the seating face rotation axis θ2 at the seat unit 20. Note that a shear moment from the seatback 14 toward an initial posture retention direction side acts directly on the back of the seated occupant at the seatback 14 side (even when there is no rotation mechanism provided to the seatback). Thus the seated occupant forms a sideways V shaped posture, namely, a posture in which a portion between the head and the lumbar region is curved, in a vehicle back face view, and the movement amount of the head is suppressed (to a minimum). This thereby enables a stable driving posture to be maintained, without direction of vision moving greatly. This enables the steering operation performance of the driver to be improved, and also enables the burden on the body of an occupant seated in a front seat (particularly the driver) to be greatly reduced. Furthermore, since the lumbar region of the occupant is allowed to sway, a similar movement to that when walking is performed without effort, particularly by the driver. This thereby enables the occurrence of lower back pain, or further worsening of lower back pain due to a long period of driving, to be suppressed or prevented, and driving comfort and steering satisfaction can be improved.

In the present exemplary embodiment, the seat unit 20 is configured in a net form, and includes the plural longitudinal direction fiber members 22 and lateral direction fiber members 24. Furthermore, the fiber members are more sparsely disposed at the seat front-rear direction rear side than at the front side of the seat unit 20, such that the rigidity at the seat front-rear direction rear side of the seat unit 20 is comparatively lower than at the front side. Thus in the present exemplary embodiment, the seating face rigidity of the seat unit 20 is realized by the placement density of the longitudinal direction fiber members 22 and the lateral direction fiber members 24. In other words, the rigidity distribution of the seat unit 20 can be set to a desired distribution, simply by changing the placement density of the longitudinal direction fiber members 22 and the lateral direction fiber members 24. The present exemplary embodiment thereby enables design to optimize seating face rigidity to be performed comparatively easily.

In the present exemplary embodiment, the number of the seating face regions 34 partitioned by the longitudinal direction fiber members 22, and the lateral direction fiber members 24 or the seat cushion frame 18 is smaller at the seat front-rear direction rear side than at the front side, such that seating face rigidity of the seat unit 20 is lower at the seat front-rear direction rear side than at the front side. The present exemplary embodiment thereby enables the rigidity distribution of the seat unit 20 to be set to a desired distribution, simply by changing the number of seating face regions 34.

In the present exemplary embodiment, both end portions of the first lateral direction fiber members 24A disposed at the seat front-rear direction front side of the seat unit 20 are fixed to the side frames 18C of the seat cushion frame 18, such that the supporting rigidity of the first lateral direction fiber members 24A at this portion is comparatively high. In contrast thereto, both end portions of the second lateral direction fiber members 24B disposed at the seat front-rear direction rear side of the first lateral direction fiber members 24A are fixed to the first longitudinal direction fiber members 22A, such that the supporting rigidity of the second lateral direction fiber members 24B at this portion is comparatively low. Fixing both end portions of the lateral direction fiber members 24 either to the side frames 18C of the seat cushion frame 18, or to the longitudinal direction fiber members 22 in this manner thereby enables the rigidity distribution of the seat unit 20 to be easily changed.

Similarly, in the present exemplary embodiment, both end portions of the first lateral direction fiber members 24A disposed at the seat front-rear direction front side of the seat unit 20 are fixed to the side frames 18C of the seat cushion frame 18, such that the supporting rigidity of the first lateral direction fiber members 24A at this portion is comparatively high. In contrast, the lateral direction fiber member non-placement region 32 in which the lateral direction fiber members 24 are not disposed, is provided at the seat front-rear direction rear side of the seat unit 20 (the seat front-rear direction rear side of the second lateral direction fiber members 24B), such that the supporting rigidity of the lateral direction fiber members 24 at this portion is equivalent to zero. Thus a large difference in the rigidity distribution of the seat unit 20 can be simply provided depending on the range over which the lateral direction fiber member non-placement region 32 is provided.

Variations

Explanation follows regarding several variations of the first exemplary embodiment.

Modified Example 1

The example illustrated in FIG. 5 is similar to the previously described seat unit 20 illustrated in FIG. 1, in that a seat unit 40 is configured by plural longitudinal direction fiber members 42 and lateral direction fiber members 44; however the seat unit 40 is configured differently from the seat unit 20 in the following respects.

In the seat unit 40, the longitudinal direction fiber members 42 are strung in a radial shape from the center of the front side frame 18A of the seat cushion frame 18. There are two types of longitudinal direction fiber members 42, these being first longitudinal direction fiber members 42A strung from the front side frame 18A to the rear side frame 18B, and second longitudinal direction fiber members 42B strung from the front side frame 18A to the respective side frames 18C. Thus the longitudinal direction fiber members 42 are strung between any two side frames of the seat cushion frame 18.

The lateral direction fiber members 44 are configured by first lateral direction fiber members 44A strung between the first longitudinal direction fiber members 42A at the left and right, and second lateral direction fiber members 44B strung between the second longitudinal direction fiber members 42B at the left and right, without being fixed to the seat cushion frame 18. The pitch of the lateral direction fiber members 44 is set to increase on progression from the seat front-rear direction front side toward the rear side. Thus the fiber members of the seat unit 40 are more sparsely disposed at the seat front-rear direction rear side than at the front side, and the number of seating face regions 46 is smaller at the seat front-rear direction rear side than at the front side. Thus in the seat unit 40, the seating face rigidity at the seat front-rear direction rear side is lower than the seating face rigidity at the seat front-rear direction front side.

In the seat unit 40, disposing the longitudinal direction fiber members 42 in a shape radiating out from the front side frame 18A of the seat cushion frame 18 enables all the longitudinal direction fiber members 42 to be strung between the any two side frames of the seat cushion frame 18, whereby a swaying amount of a seated occupant in the seat width direction is suppressed at a location at the seat front-rear direction front side, and the swaying amount in the seat width direction is increased at a location at the seat front-rear direction rear side. This enables the longitudinal direction fiber members 42 to be stably supported.

Modified Example 2

Figure 6:
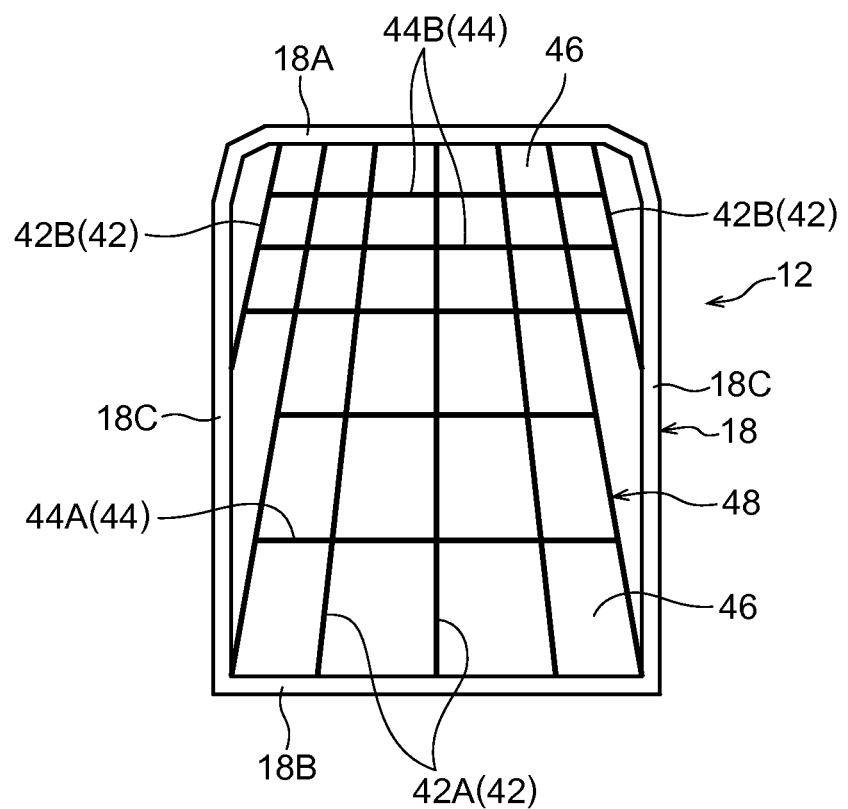
FIG. 6 is a plan view illustrating a seat cushion of a vehicle seat according to a modified example 2 of the first exemplary embodiment.

Configuration of a seat unit 48 illustrated in FIG. 6 is substantially similar to that of the seat unit 40 illustrated in FIG. 5, differing in that one of each of the second longitudinal direction fiber members 42B is disposed at the left and right. Since the overall number of longitudinal direction fiber members 42 is accordingly reduced compared to in the seat unit 40 illustrated in FIG. 5, the placement interval between the longitudinal direction fiber members 42 is wider. Adjustment of the seating face rigidity of the seat unit 48 is accordingly cruder than in the seat unit 40 illustrated in FIG. 5; however costs can be reduced by reducing the number of fiber members used, while retaining the advantageous effects of the seat unit 40 illustrated in FIG. 5, as described above.

Modified Example 3

Figure 7:
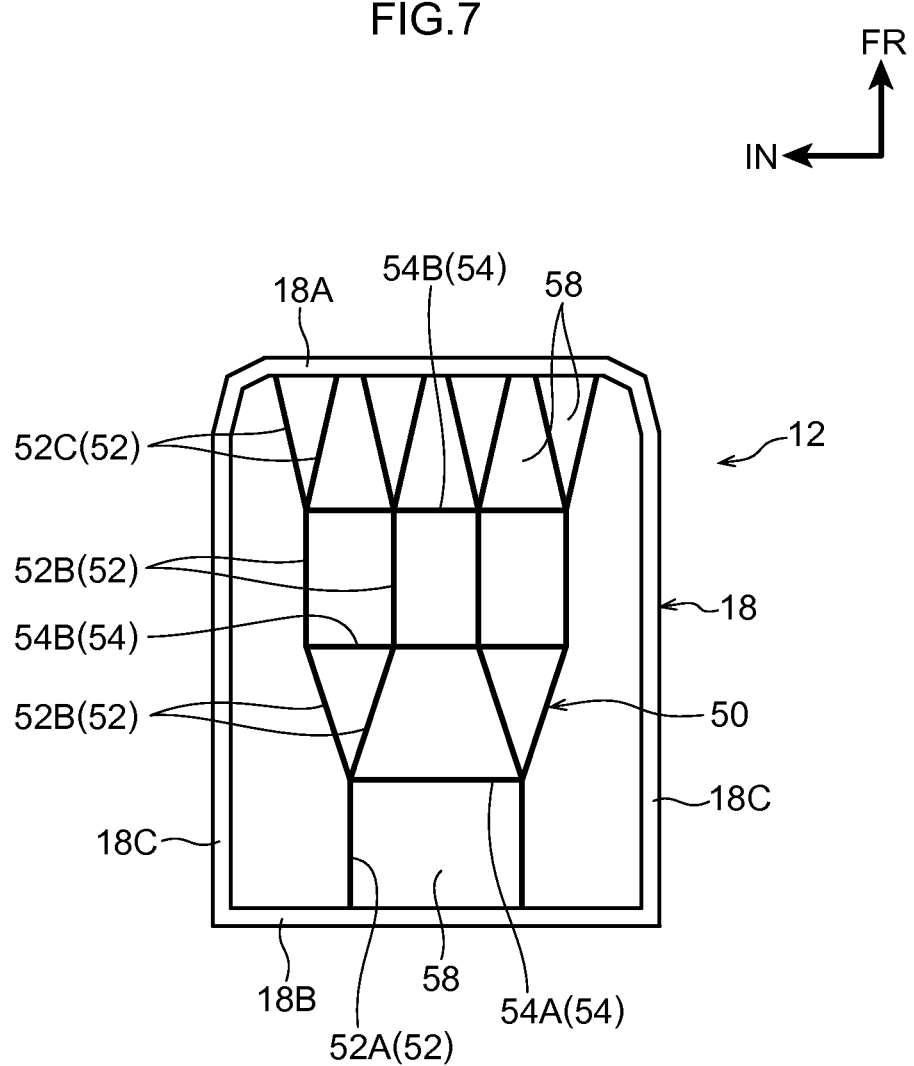
FIG. 7 is a plan view illustrating a seat cushion of a vehicle seat according to a modified example 3 of the first exemplary embodiment.

A seat unit 50 illustrated in FIG. 7 and FIG. 8 includes features that the placement density of the fiber members is set by branching partway along longitudinal direction fiber members 52. Specifically, a pair of left and right first longitudinal direction fiber members 52A extends in parallel to each other from the rear side frame 18B of the seat cushion frame 18 toward the seat front-rear direction front side. Front end portions of the pair of left and right first longitudinal direction fiber members 52A are coupled together in the seat width direction by a first lateral direction fiber member 54A. The front end portions of the pair of left and right first longitudinal direction fiber members 52A then branch into two forks to form respective second longitudinal direction fiber members 52B extending in a V shape, and the second longitudinal direction fiber members 52B then extend in parallel along the seat front-rear direction. The total of four second longitudinal direction fiber members 52B are coupled together in the seat width direction by a second lateral direction fiber member 54B. A front end portion of each second longitudinal direction fiber member 52B then branches into two forks to form respective third longitudinal direction fiber members 52C extending in a V shape. Front end portions of each of the third longitudinal direction fiber members 52C are fixed to the front side frame 18A of the seat cushion frame 18. In the above configuration, the seat unit 50 is formed with isosceles triangle shaped, isosceles trapezoid shaped, and rectangular shaped seating face regions 58.

Figure 8A:
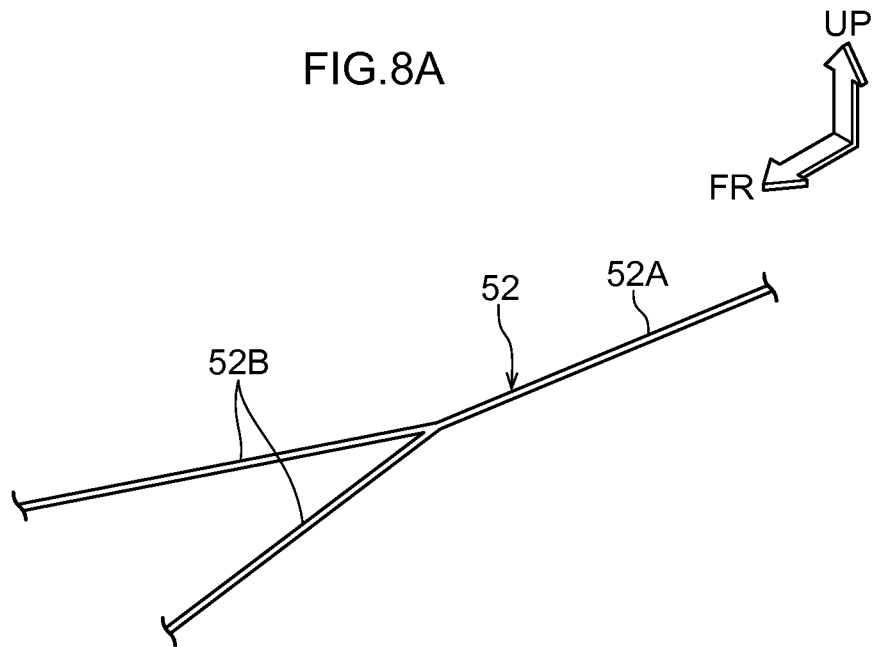
FIG. 8A is an enlarged perspective view of relevant portions illustrating an example of a branched structure of a longitudinal direction fiber member of the seat cushion illustrated in FIG. 7.
Figure 8B:
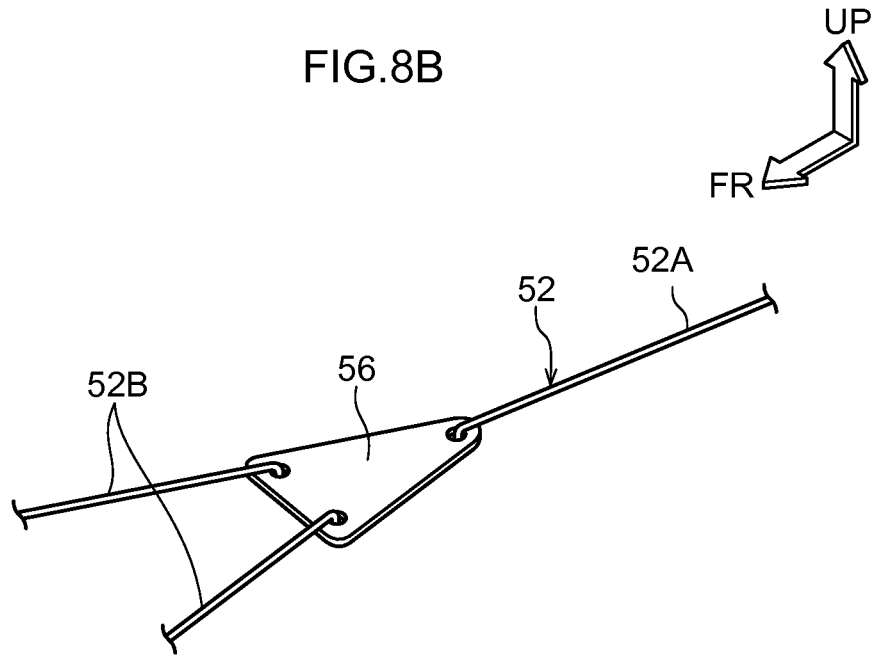
FIG. 8B is an enlarged perspective view of relevant portions illustrating an example of a branched structure of a longitudinal direction fiber member of the seat cushion illustrated in FIG. 7.

Note that the following configurations may be applied as configurations of the branched portions. As illustrated in FIG. 8A, a first example is a configuration in which two second longitudinal direction fiber members 52B branch directly from one first longitudinal direction fiber member 52A. In this example, the two second longitudinal direction fiber members 52B after branching are thinner than the first longitudinal direction fiber member 52A prior to branching. In this example, the fiber members become thinner at each branching; however an advantage is that a small number of components suffices. As illustrated in FIG. 8B, in a second example, the one first longitudinal direction fiber member 52A prior to branching, and the two second longitudinal direction fiber members 52B after branching are each fixed to respective apex portions of a coupling member 56 formed in an inverted triangular plate shape. In this example, the number of components increases; however an advantage is that the thickness of the fiber members does not change.

The seat unit 50 enables the number of seating face regions to be regularly increased between before and after branching of the longitudinal direction fiber members 52. In this example, the number of seating face regions after branching increases to (2n+1), where n is the number of seating face regions prior to branching. This enables the rigidity distribution of the seating face to be changed by branching the longitudinal direction fiber members 52 at locations where a change in the rigidity distribution of the seating face is desired.

Modified Example 4

A seat unit 60 illustrated in FIG. 9A is configured by plural longitudinal direction fiber members 62 strung between the front side frame 18A and the rear side frame 18B of the seat cushion frame 18, and plural lateral direction fiber members 64 strung between the pair of left and right longitudinal direction fiber members 62 disposed at both sides in the seat width direction. The plural longitudinal direction fiber members 62 are disposed at a uniform pitch in the seat width direction. In contrast thereto, the plural lateral direction fiber members 64 are disposed at a non-uniform pitch, such that the pitch widens on progression from the seat front-rear direction front side toward the rear side of the seat unit 60. Thus in the seat unit 60, the fiber members are more sparsely disposed at the seat front-rear direction rear side than at the front side, and the number of seating face regions 66 is smaller at the seat front-rear direction rear side than at the front side. The seating face rigidity at the seat front-rear direction rear side is accordingly lower than the seating face rigidity at the seat front-rear direction front side of the seat unit 60. In the seat unit 60, preparation of one type of the longitudinal direction fiber member 62 and one type of the lateral direction fiber member 64 suffices, thereby enabling the manufacturing cost to be reduced.

Modified Example 5

Similarly to the seat unit 60, a seat unit 70 illustrated in FIG. 9B is configured by plural longitudinal direction fiber members 72 strung between the front side frame 18A and the rear side frame 18B of the seat cushion frame 18, and plural lateral direction fiber members 74 strung between the pair of left and right longitudinal direction fiber members 72 disposed at both sides in the seat width direction. Out of these fiber members, the cord diameter of each longitudinal direction fiber member 72 increases on progression from a rear end portion toward a front end portion. Note that the lateral direction fiber members 74 are all formed with the same cord diameter, and are disposed at a uniform pitch in the seat front-rear direction.

In the above configuration, the cord diameter of the longitudinal direction fiber member 72 increases on progression from the seat front-rear direction rear side toward the front side, thereby enabling a difference in rigidity to be created by the longitudinal direction fiber member 72 itself. Namely, the seating face rigidity at the seat front-rear direction rear side is lower than the seating face rigidity at the seat front-rear direction front side in the seat unit 70. Moreover, both the number of longitudinal direction fiber members 72 used and the number of lateral direction fiber members 74 used can be reduced compared to the seat unit 60 illustrated in FIG. 9A, this being an effective way to reduce costs.

Modified Example 6

Similarly to the seat unit 60, a seat unit 80 illustrated in FIG. 9C is configured by plural longitudinal direction fiber members 82 strung between the front side frame 18A and the rear side frame 18B of the seat cushion frame 18, and plural lateral direction fiber members 84 strung between the pair of left and right longitudinal direction fiber members 82 disposed at both sides in the seat width direction. Out of these fiber members, there are four types of lateral direction fiber members 84, each with a different cord diameter, these being a first lateral direction fiber member 84A, a second lateral direction fiber member 84B, a third lateral direction fiber member 84C, and a fourth lateral direction fiber member 84D. The first lateral direction fiber member 84A to the fourth lateral direction fiber member 84D are disposed such that the cord diameter gradually increases on progression from the seat front-rear direction rear side toward the front side. Note that the longitudinal direction fiber members 82 are all formed with the same cord diameter, and are disposed at a uniform pitch in the seat width direction.

In the above configuration, the cord diameter of the lateral direction fiber members 84 increases on progression from the seat front-rear direction rear side toward the front side, thereby enabling a difference in rigidity to be created by the lateral direction fiber members 84 themselves. Namely, the seating face rigidity at the seat front-rear direction rear side is lower than the seating face rigidity at the seat front-rear direction front side in the seat unit 80. Moreover, the number of lateral direction fiber members 84 used can be reduced compared to the seat unit 60 illustrated in FIG. 9A, thereby contributing to a reduction in cost.

Second Exemplary Embodiment

Explanation follows regarding a second exemplary embodiment of the vehicle seat of the present invention, with reference to FIG. 10A to FIG. 12. Note that the same reference numerals are applied to configuration portions that are similar to those of the first exemplary embodiment previously described, and explanation thereof is omitted.

Figure 10A:
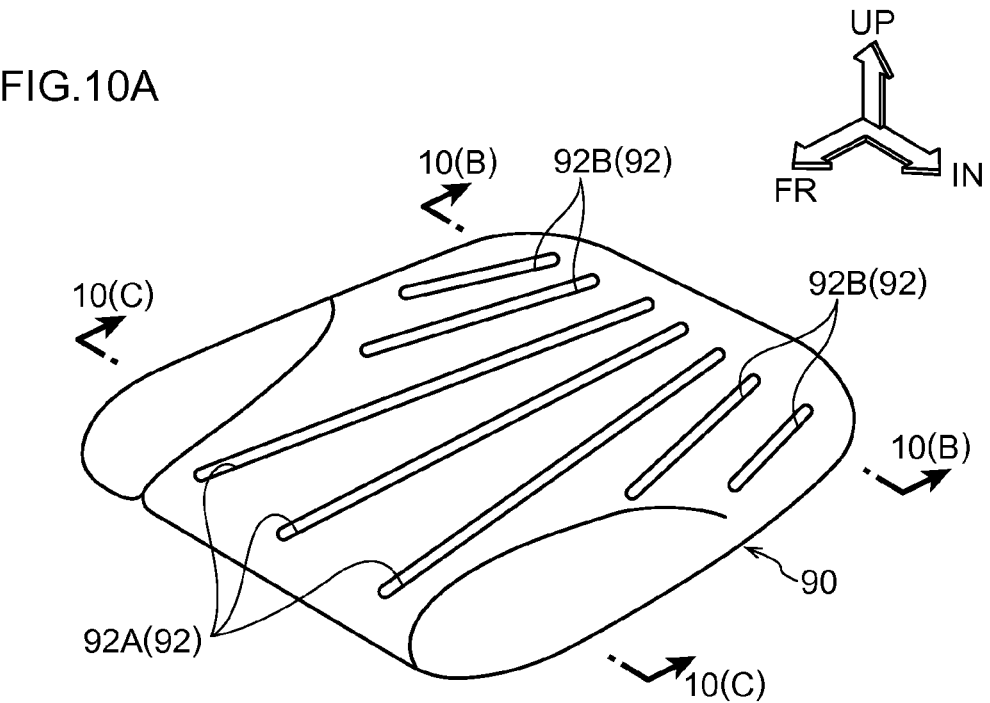
FIG. 10A is a perspective view of a seat unit of a seat cushion of a vehicle seat according to a second exemplary embodiment.
Figure 10B:
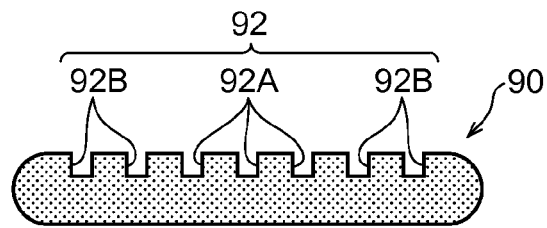
FIG. 10B is a horizontal cross-section illustrating a state of the seat unit taken along line 10(B)-10(B) in FIG. 10A.
Figure 10C:
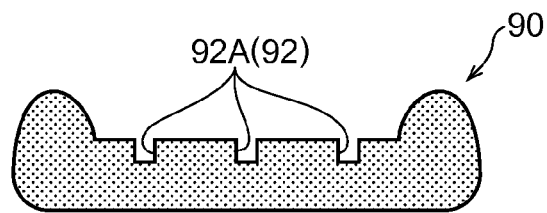
FIG. 10C is a horizontal cross-section illustrating a state of the seat unit taken along line 10(C)-10(C) in FIG. 10A.

As illustrated in FIG. 10A, in a vehicle seat according to the second exemplary embodiment, a seat unit 90 of a seat cushion is configured by a resin seat cushion pad that has cushioning properties. Specifically, the seat unit 90 is configured, for example, from urethane foam.

Plural thinned portions are formed to a seating face side of the seat unit 90, such that the seat unit 90 has lower rigidity at the seat front-rear direction rear side than at the front side. Specifically, plural recessed grooves 92, serving as thinned portions, are formed running along the seat front-rear direction at the seating face side of the seat unit 90. The recessed grooves 92 are configured by three first recessed grooves 92A formed spanning from a rear end portion to a front end portion of the seat unit 90 (see FIG. 10C), and a total of four second recessed grooves 92B, disposed extending from the rear end portion of the seat unit 90 to a front-rear direction intermediate portion of the seat unit 90, at both sides in the seat width direction of the first recessed grooves 92A (see FIG. 10B). Thus a greater number of recessed grooves 92 are set at the seat front-rear direction rear side than at the front side in the seat unit 90, and the seat unit 90 is set with a lower rigidity at the seat front-rear direction rear side than at the front side. Note that the recessed grooves 92 are formed running along the seat front-rear direction, such that the seating face rigidity of the seat unit 90 is set higher in the seat front-rear direction than seating face rigidity in the seat width direction.

Operation and Advantageous Effects

In the above configuration, the seat unit 90 is configured by a resin seat cushion pad that has cushioning properties. Moreover, in the present exemplary embodiment, plural of the recessed grooves 92, these being thinned portions, are formed to the seating face side of the seat unit 90, such that the rigidity of the seat unit 90 is lower at the seat front-rear direction rear side than the rigidity at the front side. Thus in the present exemplary embodiment, the difference in rigidity provided by the seating face of the seat unit 90 is realized by the shape of the seating face side of the seat cushion pad (the number of recessed grooves 92). In other words, the rigidity distribution of the seat unit 90 can be set to a desired distribution simply by changing the shape of the resin at the seating face side of the seat unit 90. The seat unit 90 is accordingly easy to make, and the rigidity is easy to adjust. The present exemplary embodiment accordingly enables design to optimize seating face rigidity to be performed comparatively easily, enables productivity to be improved, and also enables the rigidity to be easily adjusted.

In the above configuration, the thinned portions are configured by the recessed grooves 92 extending along the seat front-rear direction, and the number of recessed grooves 92 is greater at the seat front-rear direction rear side than at the front side, such that the rigidity of the seat unit 90 is lower at the seat front-rear direction rear side than at the front side. In short, configuration is made such that the rigidity of the seat unit 90 changes according to the number of recessed grooves 92. Thus, in a hypothetical case in which the rigidity of the seat front-rear direction rear side of the seat unit 90 is lowered to a particular rigidity, the depth of the recessed grooves 92 can be made shallower by increasing the number of the recessed grooves 92. This configuration is therefore suitable for adjusting the rigidity distribution in cases in which the seat unit 90 is wide in the seat width direction, and the thickness of the seat unit 90 is comparatively thin.

Variations

Explanation follows regarding several variations of the second exemplary embodiment.

Modified Example 1

Figure 11A:
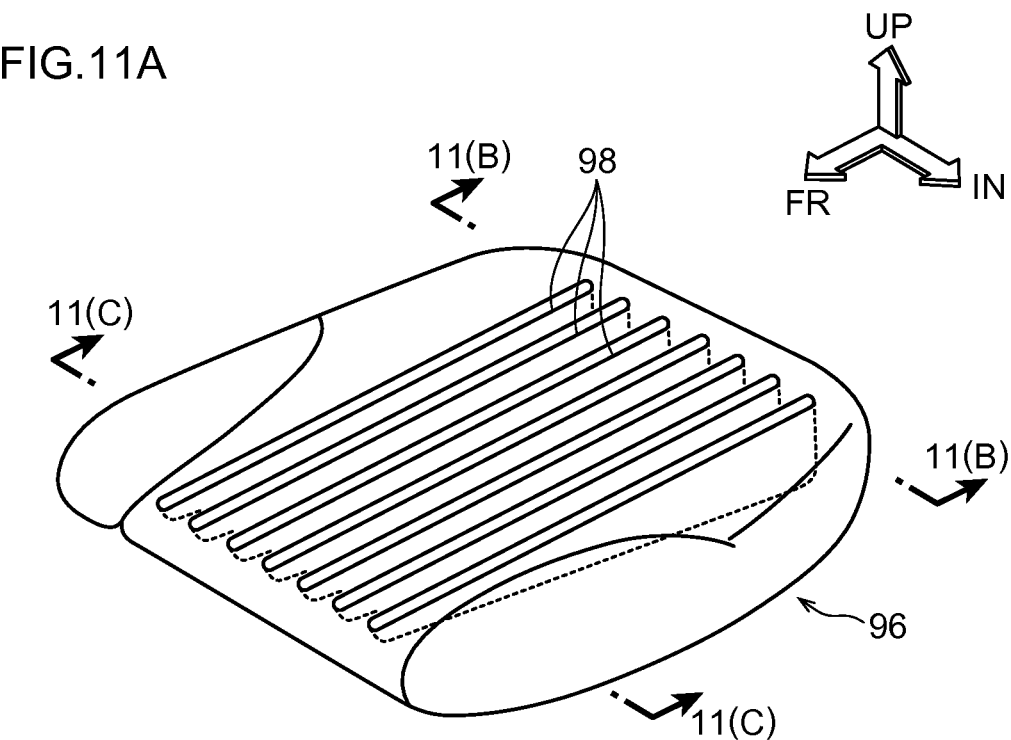
FIG. 11A is a perspective view of a seat unit, illustrating a seat unit according to a modified example 1 of the second exemplary embodiment.

The example illustrated in FIG. 11A is similar to the seat unit 90 illustrated in FIG. 10 in the respect that a seat unit 96 of a seat cushion is configured by a resin seat cushion pad that has cushioning properties.

Figure 11B:
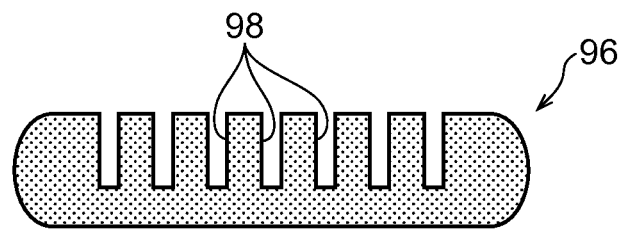
FIG. 11B is a horizontal cross-section illustrating a state of the seat unit taken along line 11(B)-11(B) in FIG. 11A.
Figure 11C:
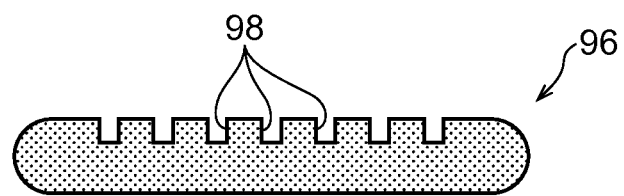
FIG. 11C is a horizontal cross-section illustrating a state of the seat unit taken along line 11(C)-11(C) in FIG. 11A.

Plural recessed grooves 98, serving as thinned portions, are formed running along the seat front-rear direction at the seating face side of the seat unit 96. The recessed grooves 98 are disposed at a uniform pitch in the seat width direction. All the recessed grooves 98 are formed spanning from a rear end portion to a front end portion of the seat unit 96, and are set with the same length direction dimension as each other. However, as illustrated in FIGS. 11A, 11B, and 11C, the groove depth of each recessed groove 98 is set so as to gradually become deeper on progression from the seat front-rear direction front side toward the rear side.

In the above configuration, the thinned portions are configured by the recessed grooves 98 extending along the seat front-rear direction, and the groove depth is deeper at the seat front-rear direction rear side than at the front side, such that the rigidity of the seat unit 96 is lower at the seat front-rear direction rear side than at the front side. In short, configuration is made such that the rigidity of the seat unit 96 changes according to the depth of the recessed grooves 98. Thus, in a hypothetical case in which the rigidity of the seat front-rear direction rear side of the seat unit 96 is lowered to a particular rigidity, the number of recessed grooves 98 can be reduced by making the recessed grooves 98 deeper. This configuration is therefore suitable for adjusting the rigidity distribution in cases in which the seat unit 96 is narrow in the seat width direction, but the thickness of the seat unit 90 is comparatively thick.

Note that the configuration illustrated in FIG. 11A may be combined with the configuration illustrated in FIG. 10A, previously described.

Modified Example 2

Figure 12:
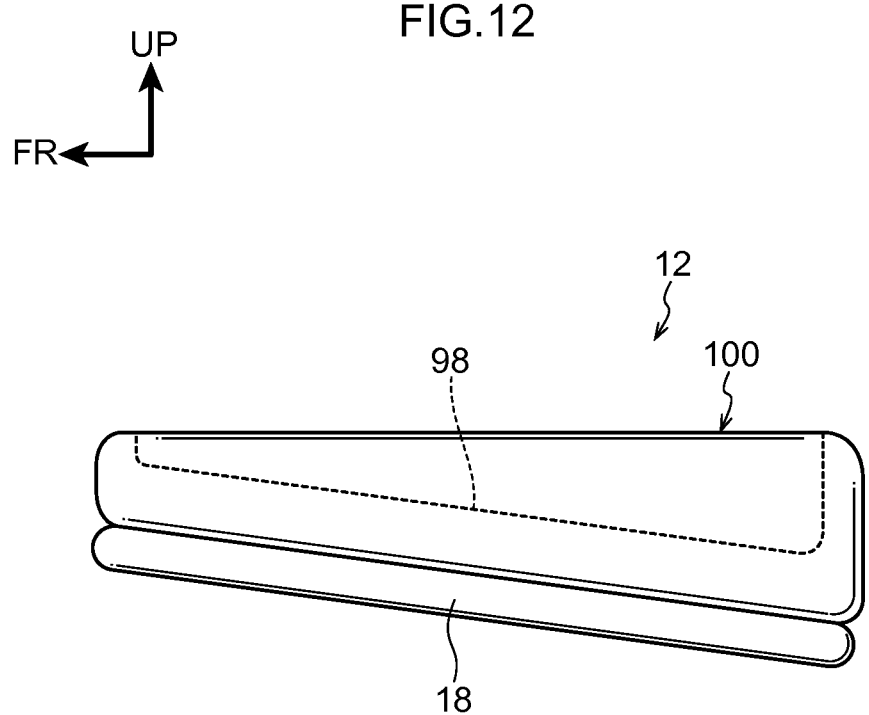
FIG. 12 is a side view illustrating a configuration of a seat cushion according to a modified example 2 of the second exemplary embodiment.

In the example illustrated in FIG. 12, the thickness of a seat unit 100 is set thicker at the seat front-rear direction rear side, and thinner at the seat front-rear direction front side, while retaining the configuration illustrated in FIG. 11, previously described. Thus the thickness of the seat unit does not necessarily need to be uniform. This point similarly applies to the second exemplary embodiment illustrated in FIG. 10A.

Note that in the exemplary embodiment illustrated in FIG. 10A to FIG. 12, are formed with the recessed grooves 92, 98, serving as thinned portions; however configuration is not limited thereto, and recessed portions, through-holes, or the like, that do not fall into the category of "grooves", may be formed instead.

Supplementary Explanation of Exemplary Embodiments

In the first exemplary embodiment and the second exemplary embodiment explained above, a support face of the seatback 14 is configured as a non-rotating structure; however configuration is not limited thereto, and the support face of the seatback may be provided with a mechanism that actively enables rotation of a seated occupant toward an upright direction from a direction in which the occupant is swung due to inertial force, when the vehicle is turning. As an example, the configuration described in the publication cited as related art, a configuration in which the support face of the seatback is supported by a resilient body disposed in a spider-web shape, or another configuration may be applied.

What is claimed is:

1. A vehicle seat comprising:
a seat cushion frame configuring a frame member of a seat cushion; and
a seat unit that is supported by the seat cushion frame and on which an occupant sits, wherein:
the seat unit is formed in a net form including a plurality of longitudinal direction fiber members extending along a seat front-rear direction, and a plurality of lateral direction fiber members extending along a seat width direction,
the longitudinal direction fiber members are disposed in the seat width direction across the seat unit,
the lateral direction fiber members are disposed more at a seat front-rear direction front side than at a seat front-rear direction rear side of the seat unit, and
the respective lateral direction fiber members are disposed more sparsely at the seat front-rear direction rear side than at the seat front-rear direction front side of the seat unit.

2. The vehicle seat of claim 1, wherein:
the longitudinal direction fiber members are thinner at the seat front-rear direction rear side than at the seat front-rear direction front side.

3. The vehicle seat of claim 1, wherein:
the lateral direction fiber members disposed at the seat front-rear direction rear side are thinner than the lateral direction fiber members disposed at the seat front-rear direction front side.

4. A vehicle seat comprising:
a seat cushion frame configuring a frame member of a seat cushion; and
a seat unit that is supported by the seat cushion frame and on which an occupant sits, wherein:
the seat unit is formed in a net form including a plurality of longitudinal direction fiber members extending along a seat front-rear direction, and a plurality of lateral direction fiber members extending along a seat width direction,
the longitudinal direction fiber members are disposed in the seat width direction across the seat unit,
the lateral direction fiber members are disposed more at a seat front-rear direction front side than at a seat front-rear direction rear side of the seat unit, and
a number of seating face regions partitioned by the longitudinal direction fiber members, and the lateral direction fiber members or the seat cushion frame is smaller at the seat front-rear direction rear side than at the seat front-rear direction front side.

5. The vehicle seat of claim 1, wherein:
both end portions of the lateral direction fiber members that are disposed at the seat front-rear direction front side of the seat unit are fixed to the seat cushion frame; and
both end portions of the lateral direction fiber members that are disposed at a rear side of the lateral direction fiber members, which are disposed at the front side of the seat unit, are fixed to the longitudinal direction fiber members.

6. The vehicle seat of claim 1, wherein:
both end portions of the lateral direction fiber members that are disposed at the seat front-rear direction front side of the seat unit are fixed to the seat cushion frame; and
a lateral direction fiber member non-placement region in which the lateral direction fiber members are not disposed is provided at the seat front-rear direction rear side of the seat unit.

\* \* \* \* \*